United States Patent [19]

Gorgone

[11] Patent Number: 4,645,936
[45] Date of Patent: Feb. 24, 1987

[54] MULTI-DENOMINATION CURRENCY VALIDATOR EMPLOYING A PLURAL SELECTIVELY-PATTERNED RETICLE

[75] Inventor: Robert L. Gorgone, Mentor, Ohio
[73] Assignee: Ardac, Inc., Eastlake, Ohio
[21] Appl. No.: 657,671
[22] Filed: Oct. 4, 1984
[51] Int. Cl.[4] ............................................. G06K 5/00
[52] U.S. Cl. .................................. 250/556; 209/534; 356/71; 382/7; 382/31
[58] Field of Search .................. 250/556, 550; 356/71; 382/7, 31, 65; 209/534

[56] References Cited

U.S. PATENT DOCUMENTS

| | | | |
|---|---|---|---|
| 3,876,304 | 4/1975 | Novak | 356/71 |
| 4,023,010 | 5/1977 | Horst | 382/31 |
| 4,041,456 | 8/1977 | Ott | 382/7 |

Primary Examiner—David C. Nelms
Attorney, Agent, or Firm—Oldham, Oldham & Weber Co.

[57] ABSTRACT

A detection system for utilization with a paper security or currency validation apparatus wherein a correlation is made between reference patterns and cross hatch lines located in the portrait background on the paper and the presence of one of two paper currencies is determined. Fundamentally the invention consists of a single reticle which contains a lens whereon are located the cross hatch references for two different paper currency denominations. Within the reticle assembly are located two photosensitive cells, one for each reference pattern. Each photosensitive cell is connected to its own authenticating circuitry which validates the presence of a specific paper currency note. Should the tested paper pass the authenticity test of one authenticity circuitry, the other is disabled. Should the tested paper fail both authenticating tests, it is rejected.

9 Claims, 5 Drawing Figures

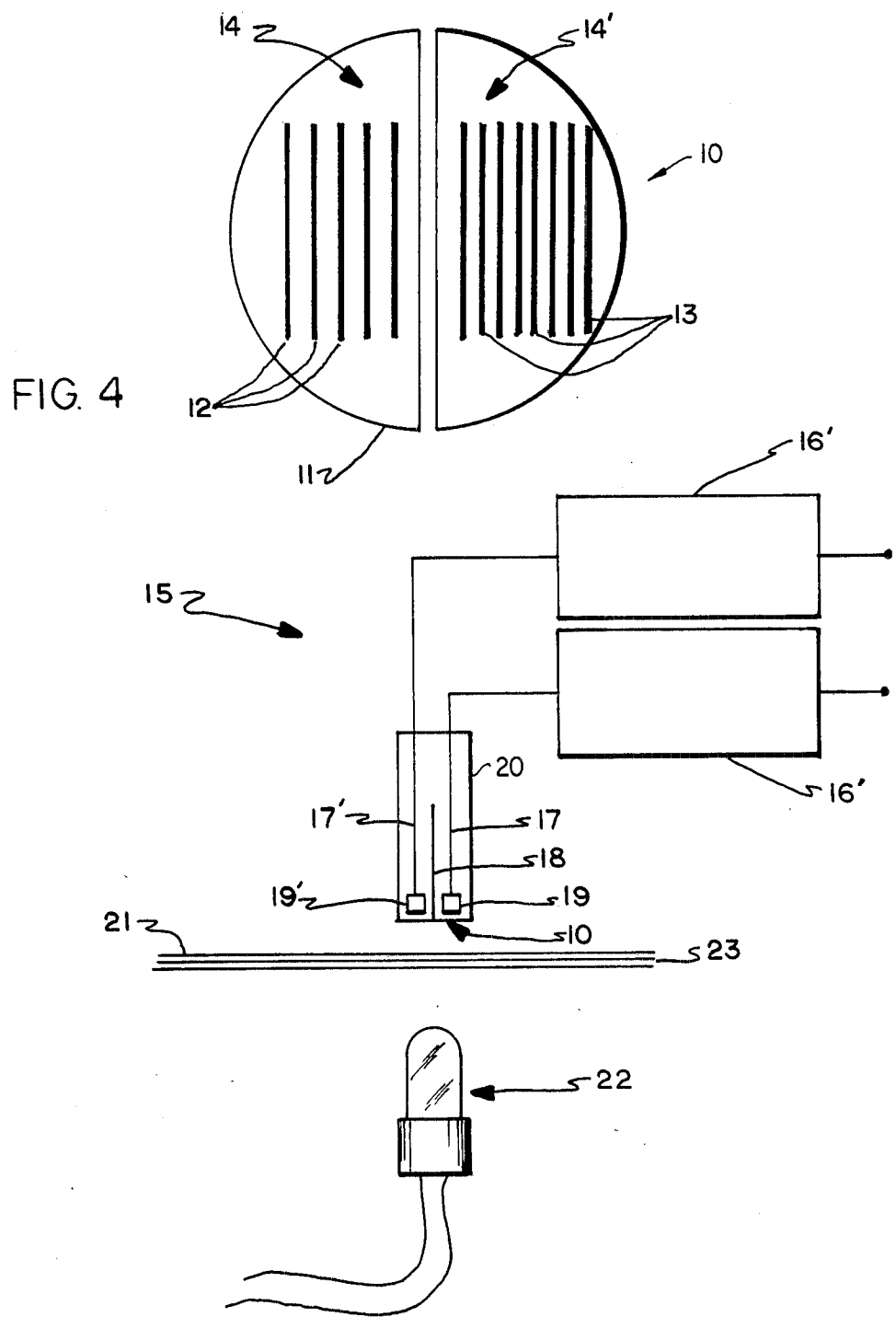

4,645,936

MULTI-DENOMINATION CURRENCY VALIDATOR EMPLOYING A PLURAL SELECTIVELY-PATTERNED RETICLE

TECHNICAL FIELD

The instant invention relates to paper currency and security validation systems and in particular to a new reticle and photodetection apparatus which will permit the authentication of a plurality of paper currency denominations with only one reticle housing assembly.

BACKGROUND ART

Heretofore various types of apparatus have been known which provide a means for determining the authenticity of paper securities or currency. Such apparatus utilize a photosensitive technique to operate on a given area of the security or paper currency, and depending on the results of the authentication tests performed, thereby determine the authenticity of the entire paper or note. In particular, standard apparatus test the cross hatch lines behind the portrait on U.S. currency or security. Of course, any of a number of patterns or arrangements could be so tested.

This generally consists of correlating the cross hatch lines or design pattern against a reference. Usually the reference consists of a reticle whereon is located a line pattern which corresponds to a specific currency note denomination or a specific security.

The reticle assembly and portrait are placed into relative movement while a light is passed through the paper and reticle. The relational position between the reticle and portrait is augmented and the light energy which passes through the paper is detected by a photosensitive cell or other detector. The relative movement between the reticle and the portrait background causes alignment and misalignment of the lines and allows for accurate measurement to be made respecting the authenticity of the background of the paper.

Referring more particularly to the figures depicting the prior art, FIG. 1 shows illustratively the cross hatch pattern 1 located in the background of portraits on some paper currency, particularly in the United States. The cross hatch pattern is comprised of vertical lines 2, horizontal lines 3 and resulting blocks 4. The line thickness and spacing between the lines is different for different currency denominations.

A reticle using only a vertical line reference pattern is shown generally as 5 in FIG. 2. The vertical lines 6 are located on a transparent lens 7. Another typical reticle is shown generally as 5' in FIG. 3. Diagonal reference lines 8 are located on lens 9. Diagonal reference lines 8 were used when photocopying resolution became good enough to copy both vertical and horizontal lines in cross hatch 1, FIG. 1, faithfully.

To date, all paper currency validation apparatus when built, possess the capability to test for the presence of only one currency denomination. This has necessiated the use of several validation apparatus wherever change or authentication is desired for various currency denominations. It has been thought that physical constraints would prohibit the inclusion of plural reticles into a single housing since the resolution required of the reticle masking would require a reticle of significant size and with sufficient lines to mask only valid patterns.

DISCLOSURE OF INVENTION

It is an objective of the invention to authenticate more than one paper currency denomination or security utilizing one validation apparatus.

It is another objective of the invention to utilize only one reticle assembly to validate more than one paper currency or security.

It is still another objective of the invention to avoid the need for multiple validation apparatus by combining at least two authentication patterns into one reticle.

It is another objective of the invention to place two photosensitive cells within one currency validator photodetection assembly.

It is yet another objective of the invention to produce a dual authentication pattern reticle which is simplistic in design and as accurate as single authentication pattern reticles.

These objectives and others which will become apparent as the detailed description is presented are achieved by a currency validation apparatus, comprising: a housing; a reticle maintained at an end of said housing and having a plurality of reference patterns thereon; and a plurality of photodetectors maintained within said housing, one such photodetector uniquely associated with each of said reference patterns.

BRIEF DESCRIPTION OF DRAWINGS

For a full understanding of the objectives, techniques and apparatus of the invention, reference should be had to the following detailed description and accompanying drawings wherein:

FIG. 4 shows the split lens used by the instant invention which contains the reference patterns for two different paper currency denominations; and FIG. 5 shows schematically, the arrangement of the various components of the reticle assembly, photodetection apparatus, and authenticating circuitry in an operational configuration.

BEST MODE FOR CARRYING OUT THE INVENTION

Figure 1:
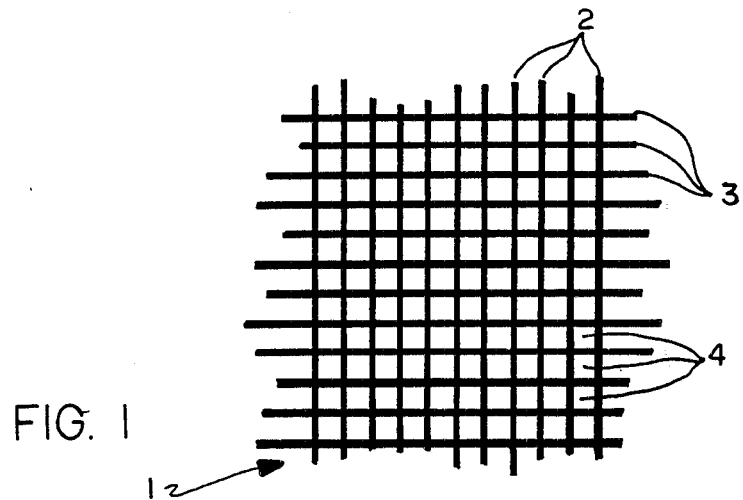
FIG. 1 is an exploded view of a typical grid or cross hatched pattern from a portrait background.
Figure 2:
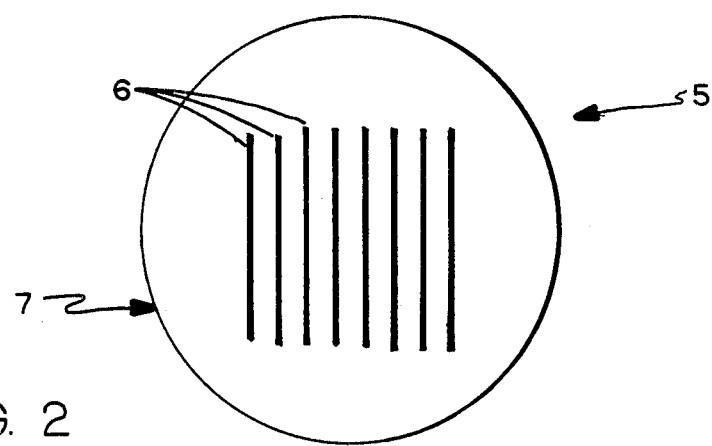
FIG. 2 is an example of a typical prior art reticle with reference pattern lines.
Figure 3:
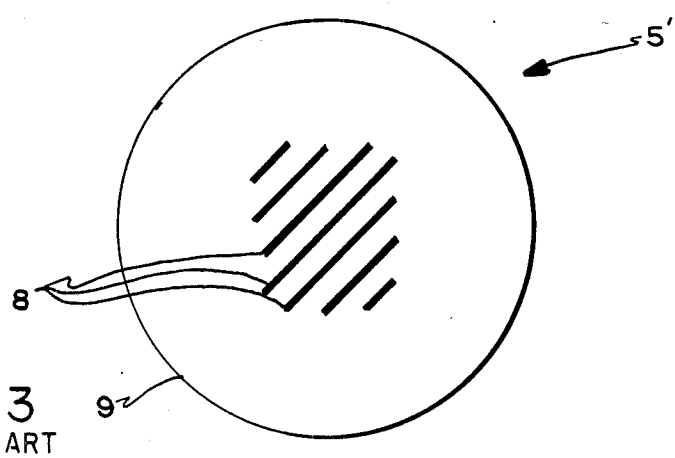
FIG. 3 is another example of a prior art reticle with reference pattern lines.

Referring again to the drawings, and more particularly FIGS. 4 and 5, it can be seen that the invention comprises two basic parts, a reticle 10 and the photosensitive detection assembly 15.

The reticle 10 is shown in FIG. 4. A transparent lens 11 is divided into halves 14 and 14'. Vertical reference lines 12 for a specific paper currency denomination are located on lens half 14. Vertical reference lines 13 for a different paper currency denomination are located on lens half 14'. Of course, the lines 12 and 13 are of a different spacing and mask the transparency of the lens.

The photosensitive detection assembly is shown schematically as 15 in FIG. 5. Photosensitive cells 19 and 19' are housed within tubular reticle housing 20. The cells are photoelectrically isolated from each other by divider 18 such that each cell corresponds to only reticle half 14 or half 14'. Thus each cell will detect matches between a specific valid paper currency denomination and the reference pattern assigned to it.

The photosensitive cells 19 and 19' are connected to authenticating circuits 16 and 16' by circuit wiring 17 and 17' respectively.

In operation, light source 22 emits light which passes through the paper currency 21 received on the tray 23. The reticle assembly and paper currency are placed into relative linear motion such that the reference patterns of the reticle and the cross hatch pattern in the background of the portrait on a U.S. note are made to pass over each other, resulting in degrees of alignment and misalignment therebetween. This alignment and misalignment causes the photocells 19 and 19' to produce electrical current patterns which are transmitted by wiring 17 and 17' respectively, to separate authenticating circuits 16 and 16'. The electrical current patterns are correlated with stored patterns as to frequency and/or amplitude and/or signal count. Alternatively, the electrical current patterns are integrated or otherwise summed and stored, then compared to a reference, to determine authenticity. If a correlation is found in one of the circuits, 16 or 16', a "vend" signal is emitted for that circuit in standard fashion and the other is inhibited. If no correlation is found, the paper currency is rejected and returned. It will be understood, of course, that additional validation tests may also be conducted to determine the presence or absence of color and the like.

The invention has been presented with particular respect to the testing of U.S. currency having a cross hatch pattern in the portrait background. Of course, the concept also applies to other patterns which may be tested or detected in the authentication process. Similarly, the multiple patterns maintained upon the reticle need not be in side by side relationship, but could be maintained one atop the other, in quadrants, or any other suitable arrangement.

Thus it can be seen that the objects of the invention have been satisfied by the structure presented hereinabove. The invention allows the validation of at least two distinct currency denominations with the same reticle and photodetection assembly. While only the best mode and preferred embodiments of the invention have been presented and described in detail, it will be understood that the invention is not limited thereto or thereby. Accordingly, for an appreciation of the true scope and breadth of the invention, reference should be had to the following claims.

What is claimed is:

1. Currency validation apparatus, comprising:
   a housing;
   a reticle maintained at an end of said housing and having a plurality of reference patterns thereon, one such pattern for each of an equal plurality of currency denominations to be validated by the apparatus; and
   a plurality of photodetectors maintained within said housing, one such photodetector uniquely associated with each of said reference patterns.

2. The currency validation apparatus as recited in claim 1 wherein dividers isolate each photodetector from all other photodetectors.

3. The currency validating apparatus as recited in claim 2 wherein said patterns each comprise spaced apart parallel lines.

4. The currency validation apparatus as recited in claim 3 wherein the spacing of said parallel lines for each of said reference patterns is different.

5. The currency validation apparatus as recited in claim 4 wherein said reference patterns are maintained in side by side relationship.

6. The currency validation apparatus as recited in claim 5 wherein said lines of each pattern are parallel to the corresponding lines of all other said patterns.

7. The currency validation apparatus as recited in claim 5 which further includes circuit means connected to each photodetector, receiving output signals from the associated photodetector, and thereby determining the authenticity of paper tendered as valid currency of a particular denomination.

8. The currency validation apparatus as recited in claim 7 which further includes means for inhibiting all but one of said circuit means upon a determination of authenticity.

9. The currency validation apparatus as recited in claim 8 which further includes means for inhibiting all of circuit means upon failure of any one such circuit means to determine authenticity.

* * * * *